(12) United States Patent
Baltar et al.

(10) Patent No.: US 11,425,639 B2
(45) Date of Patent: Aug. 23, 2022

(54) TRUSTED METHOD FOR CONSUMING AND SHARING WI-FI INTERNET ACCESS

(71) Applicant: International Business Machines Corporation, Armonk, NY (US)

(72) Inventors: Alexandre de Queiroz Baltar, Sao Paulo (BR); Claudio Einicker Garrido, Rio de Janeiro (BR); Marcos Vinicius Landivar Paraiso, Sao Paulo (BR); Marco Aurelio Stelmar Netto, Sao Paulo (BR); Sergio Varga, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/332,076

(22) Filed: Oct. 24, 2016

(65) Prior Publication Data
US 2018/0115946 A1     Apr. 26, 2018

(51) Int. Cl.
*H04W 48/20* (2009.01)
*H04M 15/00* (2006.01)
(Continued)

(52) U.S. Cl.
CPC ............ *H04W 48/20* (2013.01); *H04L 63/00* (2013.01); *H04L 67/141* (2013.01); *H04M 15/48* (2013.01); *H04M 15/735* (2013.01); *H04M 15/8083* (2013.01); *H04W 4/24* (2013.01); *H04W 12/009* (2019.01);
(Continued)

(58) Field of Classification Search
None
See application file for complete search history.

(56) References Cited

U.S. PATENT DOCUMENTS

| 7,962,617 B2 | 6/2011 | Chevalier et al. |
| 8,095,172 B1 | 1/2012 | Cole et al. |

(Continued)

FOREIGN PATENT DOCUMENTS

| CN | 103731931 A | 4/2014 |
| WO | WO 2015/066248 A1 | 5/2015 |

OTHER PUBLICATIONS

Peter Mel, et al., "The NIST Definition of Cloud Computing", National Institute of Standards and Technology, Nov. 16, 2015, pp. 7-13.

*Primary Examiner* — Nicholas Sloms
(74) *Attorney, Agent, or Firm* — Joseph Petrokaitis, Esq.; McGinn I.P. Law Group, PLLC.

(57) ABSTRACT

A method (and structure) to connect a mobile device to a local Wi-Fi network includes providing an input capability for a user of the mobile device to request to make a connection to a local Wi-Fi network. A processor on the mobile device retrieves, from a memory device of the mobile device, a listing of registered local Wi-Fi networks available at the user's current location. A request to connect to a selected one of the registered local Wi-Fi networks listed on the retrieved listing of registered local Wi-Fi networks is transmitted from the mobile device. The mobile device is connected to the selected registered local Wi-Fi network upon receipt of an indication by the selected registered local Wi-Fi network that the user has been validated and verified as trustable.

15 Claims, 7 Drawing Sheets

(51) Int. Cl.
*H04W 84/12* (2009.01)
*H04W 76/18* (2018.01)
*H04L 67/141* (2022.01)
*H04W 88/02* (2009.01)
*H04W 4/24* (2018.01)
*H04W 76/10* (2018.01)
*H04W 12/00* (2021.01)
*H04L 9/40* (2022.01)
*H04W 12/069* (2021.01)
*H04W 48/16* (2009.01)
*H04W 60/00* (2009.01)
*H04W 88/04* (2009.01)

(52) U.S. Cl.
CPC ......... *H04W 12/069* (2021.01); *H04W 76/10* (2018.02); *H04W 76/18* (2018.02); *H04W 84/12* (2013.01); *H04W 88/02* (2013.01); *H04W 48/16* (2013.01); *H04W 60/00* (2013.01); *H04W 88/04* (2013.01)

(56) References Cited

U.S. PATENT DOCUMENTS

| | | | | |
|---|---|---|---|---|
| 9,009,805 | B1* | 4/2015 | Kirkby | G06K 9/00711 726/7 |
| 9,319,370 | B2* | 4/2016 | Whitmyer, Jr. | G06F 21/6218 |
| 2008/0181187 | A1* | 7/2008 | Scott | H04W 48/18 370/338 |
| 2009/0088133 | A1* | 4/2009 | Orlassino | H04L 63/08 455/411 |
| 2012/0278466 | A1 | 11/2012 | Jallapelli et al. | |
| 2013/0155849 | A1 | 6/2013 | Koodlie et al. | |
| 2013/0184000 | A1 | 7/2013 | Cook et al. | |
| 2013/0295962 | A1* | 11/2013 | Manroa | H04W 4/02 455/456.3 |
| 2014/0161113 | A1* | 6/2014 | Cui | H04W 12/50 370/338 |
| 2014/0199968 | A1* | 7/2014 | Canpolat | H04W 52/0229 455/411 |
| 2014/0220898 | A1 | 8/2014 | Zhang et al. | |
| 2014/0289034 | A1* | 9/2014 | Wu | G06Q 30/0231 705/14.31 |
| 2014/0328190 | A1* | 11/2014 | Lord | H04W 24/08 370/252 |
| 2015/0142595 | A1* | 5/2015 | Acuna-Rohter | G06Q 30/06 705/21 |
| 2015/0304920 | A1* | 10/2015 | Cootey | H04W 36/08 455/436 |
| 2015/0312760 | A1* | 10/2015 | O'Toole | H04L 67/02 455/411 |
| 2016/0050281 | A1* | 2/2016 | Jain | H04L 63/083 726/7 |
| 2016/0135116 | A1* | 5/2016 | Chen | H04W 48/20 455/450 |
| 2016/0212695 | A1* | 7/2016 | Lynch | H04W 48/18 |
| 2016/0294619 | A1* | 10/2016 | Schroeder | H04L 51/14 |
| 2018/0041943 | A1* | 2/2018 | Visuri | H04M 15/8351 |

* cited by examiner

TRUSTED METHOD FOR CONSUMING AND SHARING WI-FI INTERNET ACCESS

BACKGROUND

The present invention relates to establishing Wi-Fi connectivity, and more specifically, to an application program permitting a user to dynamically connect to any trusted Wi-Fi network and to make such connection without having to register or authenticate at the time of connection.

INTRODUCTION

The usage of mobile applications is exploding. According to International Data Corporation (IDC), a global provider of market intelligence, advisory services, and events for the information technology, telecommunications and consumer technology markets, 87% of connected devices sales by 2017 will be tablets and smartphones. These mobile applications require connectivity to backend systems or cloud based applications. Another study from Cisco predicts that within the next two years, close to 100% of smartphones will use Wi-Fi, smartphone owners will use Wi-Fi at least 50% of the time to connect to the Internet and 80% of all mobile consumers will use public Wi-Fi.

Such connectivity is usually provided by telephone companies, carriers, Internet providers, and any major or minor business, non-profit organization, public companies, government, and regular users through enablement of Wi-Fi networks. The access in its majority is controlled, secured, paid, and enabled by a variety of routers and security and encryption mechanisms.

To access some mobile applications and the Internet there is a need to have TCP/IP connections available where the user is located. If the user does not have TCP/IP connectivity the mobile application will be useless. Moreover, users often find that there is a need for Internet access everywhere and/or at any time. Most mobile users, when traveling or having dinner, when buying or shopping or in a public place, whether using 3G, 4G, or Wi-Fi, have at some time wanted to access a mobile application only to realize that there is no network connectivity.

As mentioned, even when Wi-Fi networks are available a user might not be able to connect because of lack of credentials. Many Wi-Fi networks are not free and, in fact, most are password-protected or require enrollment. Moreover, there are considerable numbers of personal Wi-Fi networks that could be available for users if a mechanism were available to permit access to such personal networks by users other than the owners. These thousands of Wi-Fi personal networks are available all over the world and are, for the most part, not used, even if the owner is paying a fee, and would be available to be shared among other users.

Current market solutions such as Boingo®, Skype® WiFi provide Wi-Fi capabilities around the world. However, such current systems require single account and registration to access their registered Wi-Fi networks.

The present inventors therefore have recognized a need for a solution to permit any mobile user or mobile application to connect to any trusted Wi-Fi network without needing to register at the time of connection or to provide a credential for authentication. An additional benefit of the present invention is that it facilitates the use of private Wi-Fi networks so that anyone can become a Wi-Fi provider.

SUMMARY

According to an embodiment of the present invention, a mobile user can dynamically connect to any trusted Wi-Fi network and can connect without having to register at the time of connection and does not have to present credentials for authentication. The present invention thus provides a transparent access to Wi-Fi networks through mobile applications, meaning that the network connection between a mobile device and the network will be performed as a back process in which the Wi-Fi connection is transparent to the mobile device user.

Other benefits of the present invention will be explained in the following description but another particularly noteworthy benefit is that anyone with a personal Wi-Fi network can become a registered Wi-Fi provider of the present invention and leverage his or her personal network by getting credits for its usage by others and then use that accumulated credit to access others' Wi-Fi networks or even to pay his or her Internet bills. This feature permits the considerable number of personal Wi-Fi network owners to use their network as an asset by which they can offset some expenses of using Wi-Fi services at locations other than their own personal Wi-Fi location.

So, imagine in the situation described above, if a user does not have to worry about network connectivity, by just turning on his or her mobile device and can almost immediately start to use a mobile application by leveraging any kind of Wi-Fi network (private, public, personal) without having to worry about paying for the usage or any specific connection details for connecting to specific local networks. The method of the present invention provides a method for a dynamic Internet sharing and consumption connection via a Wi-Fi trusted management system (where trust is based on a leverage of social media networks) that will enable any user to quickly connect and use their mobile device without need to worry about knowing local Wi-Fi networks or their connectivity setup, such as security protocol, user ID, password, etc., as long as those local Wi-Fi networks are part of the trusted system of the present invention, thereby allowing seamless access to the Internet. Moreover, such method would also benefit owners of personal Wi-Fi networks since, when their access is shared, a metering and charge back system will grant them credits that could be used to pay their own Internet bills.

DETAILED DESCRIPTION

Figure 1:
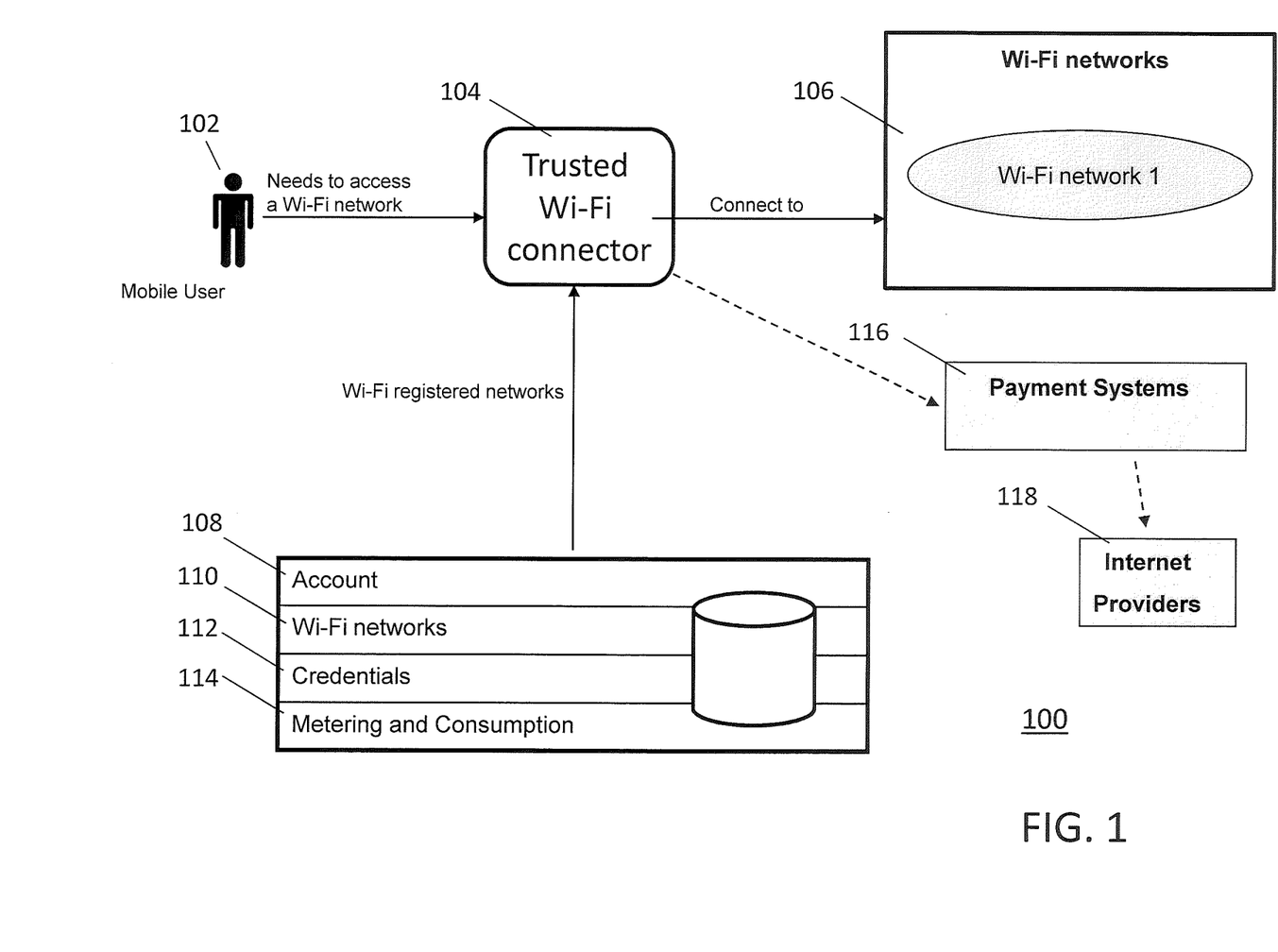
FIG. 1 shows an exemplary high-level scenario and solution of the present invention.

With reference now to FIG. 1, a typical scenario 100 will now be described, along with a high-level description of the solution provided by an exemplary embodiment of the present invention. As shown, mobile user 102 has just arrived in a foreign country and needs to access a local Wi-Fi network, for example, by contacting a wireless access point (WAP). Upon opening the mobile application 104 of the present invention and, possibly, in some embodiments, executing an app sign-in process, the user 102 is able to connect to a local Wi-Fi network 106 without concerns about local Wi-Fi passwords or other connection issues including payment issues such as providing an account number or credit card information. The system maintains user accounts 108 in a database at a remote server. The mobile app 104, exemplarily referred to herein as WifiSup, can automatically attempt to connect the user's mobile device to one of the registered Wi-Fi networks available at the user's present location.

The WifiSup application installed on the user's mobile device provides a listing 110 of available local networks and maintains credentials 112 for each available network, as well as providing automatic metering and consumption 114 functions and reporting, which will, in turn, automatically interface with payment systems 116 to Internet providers 118 for the connection and usage of the local Wi-Fi network. The WifiSup App on the mobile device can display a menu by which the user can select a local network from the listed networks. In a preferred exemplary embodiment, the app can automatically determine a preferred local network, based on connection preference parameters provided by the user upon the user's initial registration, and will attempt to connect to the selected network either automatically or based upon a connection request via an app menu command.

The present invention summarized in FIG. 1 provides a number of benefits to Wi-Fi users. First, it enables mobile apps to be accessible anytime and anywhere, since there will always be a connection Wi-Fi network available, whether personal, business, public, or secured. The mobile application 104 enables users to expedite mobile access by automatically handling connection details as a background activity.

The present invention also increases mobile application usage by allowing these applications to be always available since Internet connectivity is always available. It will also reduce Wi-Fi costs since it can increase Wi-Fi network utilization up to 100% and will enable dynamic connection to any Wi-Fi network. It provides transparent access through the mobile application, allowing a user to connect without requiring the user to register at the time of connection. Another benefit is that the present invention also permits the user to leverage his or her personal Wi-Fi network and get credits for its usage by others, thereby permitting the user to access others' Wi-Fi networks or to even use the credits to pay his/her Internet bills.

Although not specifically shown in FIG. 1, one of ordinary skill in the art, as well as lay persons, will readily recognize that the user 102 is operating a mobile device, such as a smart phone, which is inherently computer-based, in order to interface with Wi-Fi, local networks, and the Internet. Thus, the user's mobile device will incorporate one or more processors (e.g., a central processing unit(s), aka CPU, or a microprocessor) and at least one memory device storing instructions to be sequentially executed by the CPU or microprocessor. The mobile device thus can selectively execute a program as retrieved from a memory device in the mobile device that stores instructions for executing software, as a sequence of machine-readable instructions tangibly embodied on a memory device in the mobile device. The application program of the present invention is one such computer program that can be selectively executed by the user to connect to a local Wi-Fi without getting involved with the details of making such connection that are typical in the conventional methods of connecting to a local network.

Typically, a user will have a number of apps installed on their mobile device, so the Wi-Fi connection app of the present invention would typically be only one of perhaps many apps available to the user. The Wi-Fi app of the present invention might be invoked initially to make a Wi-Fi connection as necessary to permit another app on the mobile device to be invoked, if Internet access is required for the second app.

Figure 2:
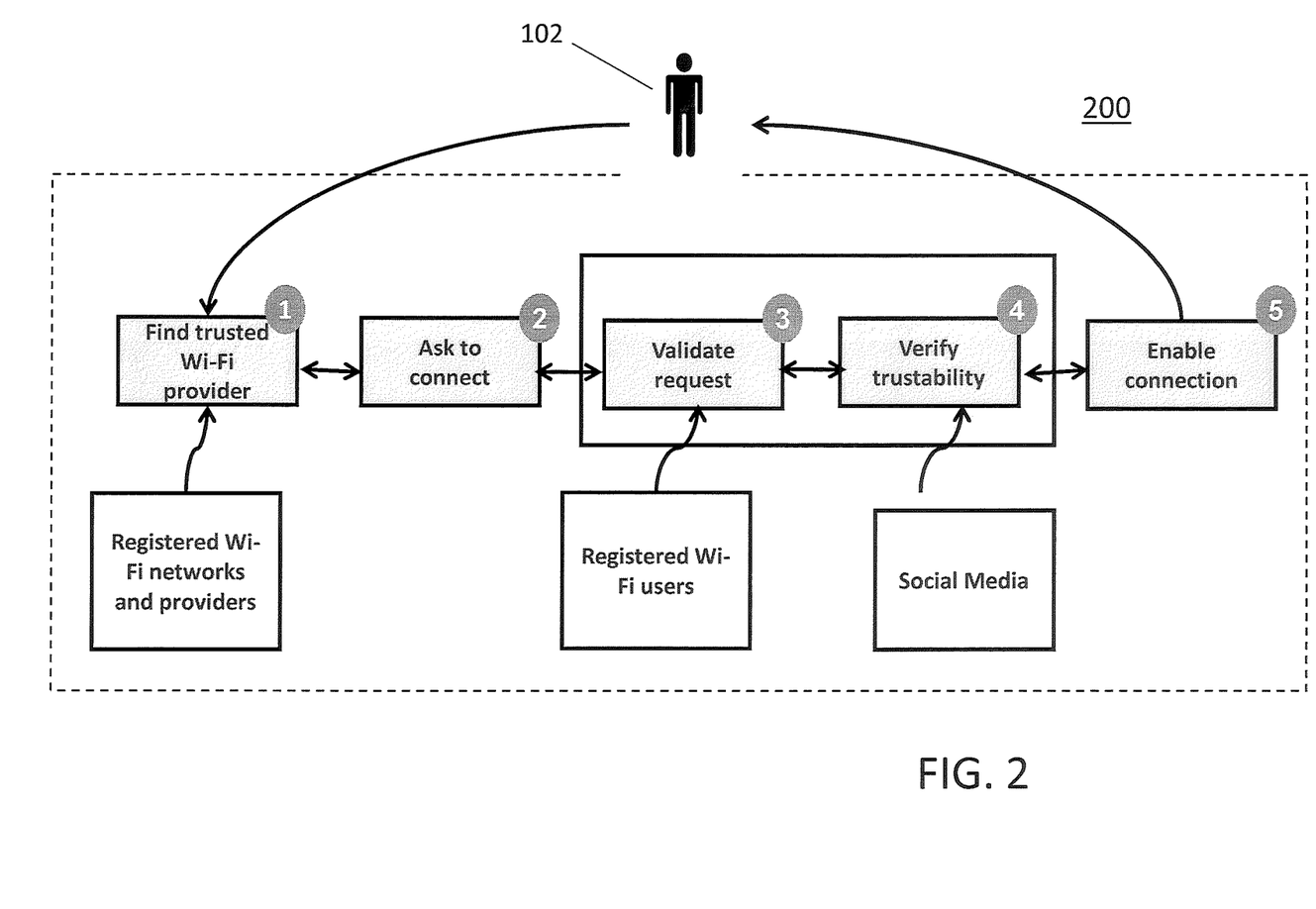
FIG. 2 shows a high level architecture 200 of an exemplary embodiment of the present invention.

FIG. 2 shows a high-level flow 200 of the mobile application of the present invention. Upon arriving at a new location, user 102, in step 1, contacts the WifiSup application to find a trusted Wi-Fi provider and ultimately, in step 5, is connected.

To enable such connection procedure, the application accesses a database on the mobile device that was previously downloaded to list local registered Wi-Fi networks available at the user's current location. A complete listing of all the local networks registered with the system of the present invention is available from a remotely-stored global database of registered Wi-Fi networks and providers, as meaning those networks and providers that have agreed to participate in the method of the application of the present invention, including the execution of program code that permits the selected local provider to contact whichever social media the user has identified upon initial registration. This database is located at one or more remote servers accessible via the Internet, with access to this server and database possibly using a cloud service.

The global database is too large to be downloaded on the user's mobile device at current memory sizes, Therefore, when user 102 intends to travel to a new location, the user 102 typically will request the WifiSup application to download, prior to departure, to the user's device a listing of registered Wi-Fi networks and providers at the intended location. The application incorporates menu items specifically related to this step of preliminary downloading at any desired specific location. Note that the listing at the intended location should ideally have been downloaded onto the user's mobile device prior to arrival at the new location since it is assumed that the user would not be able to connect at this location without aid of the application program, and the user's mobile device would typically be unable to store all possible registered local networks available around the world.

However, since the present inventors have recognized that some travelers may have forgotten to download onto their mobile devices a listing of registered Wi-Fi networks at their intended destination, there are alternatives available to the traveler. As a first possible alternative, some locations will have access to a premium provider so that the user 102 can contact the premium provider(s) upon arrival, using the application, and have the local listing downloaded via the premium provider. As another possible, albeit less desirable, alternative and if no premium provider is available, the user might even be able to access the listing of local registered Wi-Fi networks by temporarily using a non-registered local network that is open and available upon arrival. It should be clear that both of these alternatives defeat at least some of the convenience of an easy connection that is possible when the local registered networks at the new location have been pre-loaded prior to arrival.

Upon physically arriving at the new location, user 102 will invoke the application program on his or her mobile device and use a menu sequence, in step 1, to find and select a trusted Wi-Fi provider at that location or make a menu command to have the application automatically select a Wi-Fi provider from the listing, based on selection preference parameters previously entered by the user during the user's initial registration to the system of the present invention. The user 102 will then ask to connect in step 2, again using a menu provided in the application program specific to these connection steps unless the connection attempt is automatic without the user's inputs.

Once an initial contact has been made to the selected registered local network, in step 3, the selected provider will then automatically interface with the remote server for purpose of validating that user 102 is pre-registered in database 108 as a valid user eligible to continue connection under the system of the present invention. At that time the WifiSup application will also retrieve from database 108 the social media tools that the user 202 has pre-registered for purpose of confirming trustability. Both step 3 (validation) and subsequent step 4 (verify trustability) are executed automatically by the system once the user 102 has asked to connect. In step 4, to confirm that the user 102 is who they claim to be, the system will use a social media interface to verify the trustability of user 102 to the selected network/provider, so that the connection will be enabled in step 5.

In the step 4 trustability verification, for each identified social media tool, the method will identify whether the user is a close friend by checking whether he or she is direct-connected to the user Wi-Fi provider, for example, whether the user is a follower at Twitter®, Direct Connected at LinkedIn®, a friend at Facebook®, etc. The trustability verification is executed by the selected registered local network or service provider, using code from application WifiSup that was downloaded as part of the registration process of the local network or service provider for purpose of permitting the local network or service provider to participate in the method and system of the present invention. The particular portion of the WifiSup code for trustability verification would permit the selected registered local network or service provider to interface with the social media identified in the user's account information, as transmitted by the system server to a registered local Wi-Fi network or service provider requesting such data.

If the system can detect a match for the user 102, it will "flag" user 102 as a trustable user. In a variation, the system could also enable trust for a friend-of-friend status, for example, whether the requester user is connected to a close friend mine In another variation, the system could also enable trust for a requester user that has similar interests on the provider, for example, both are connected to the same company, soccer team, travel channel, etc.

After the method has completed the trustable validation (s), it will enable connection for the user by setting the trustable flag. Filters can be pre-configured by the provider or automatically enabled based on the trustability of the user, including various filters to ensure that the user will use the connection properly. For example, for each registered user there might be an access filter that enables only specific sites and protocols. Another filter could be a bandwidth filter that limits bandwidth usage of the requested connection. Another possible filter could be a priority filter that sets a quality of service (QoS) for the requested connection.

Yet another variation of the method could be the addition of a reputation system for each registered user such that the user's previous Wi-Fi usage can be a factor to enable or leverage the user's current request.

In a preferred exemplary embodiment, the selected Wi-Fi provider would execute the authentication of the user 102 by contacting the remote server and request that the remote server verify that the user is registered in the database of registered users and, if so, also request that the remote server retrieve and transmit identification of the social media that were pre-registered by the user during the user's registration process, so that the Wi-Fi provider/service can execute a program to contact these previously-registered social media to verify trustability of the user.

Figure 3:
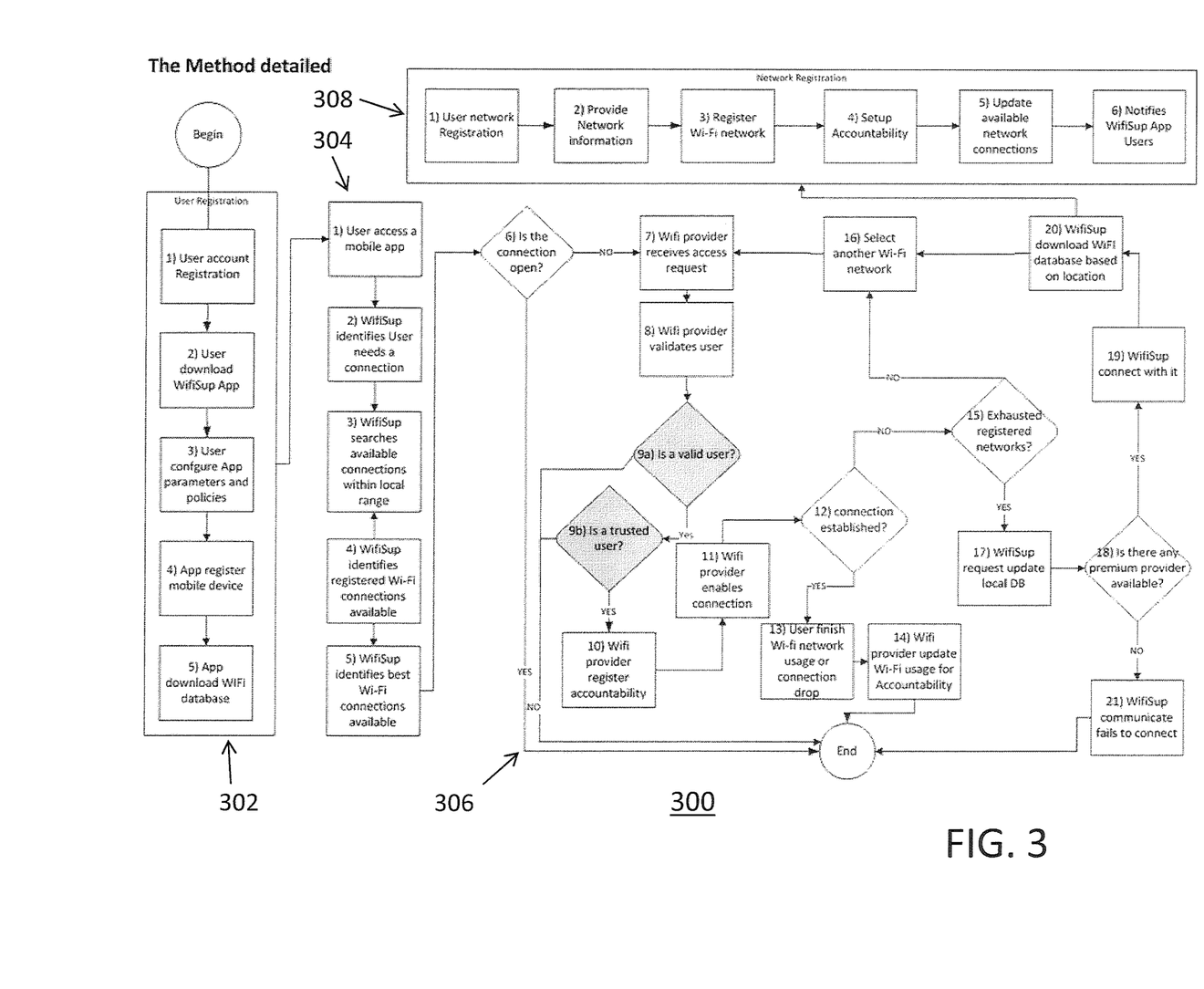
FIG. 3 shows in flowchart format 300 a method of an exemplary embodiment of the present invention.

FIG. 3 shows in flowchart format 300 more details on the method of the present invention, beginning at the user registration sequence 302 to the WifiSup application. Sequence 304 shows actions of application WifiSup as the registered user requests a local connection, and sequence 306 shows steps that complete a requested connection. Sequence 308 shows network events that the WifiSup application takes when a connection to the registered networks at the user's location have been tried and connections to all networks have failed and another premium provider is detected as available at that location.

Thus, the user validation step 3 of FIG. 2 can be autonomously done by the steps 7 and 8 of the sequence 306 shown in FIG. 3, wherein the WifiSup program, upon opening a local connection, sends a request to the connected Wi-Fi provider which, in turn, checks its database and validates the user as a valid user for that provider. The trustability verification step 4 of FIG. 2 is shown in step 9b of sequence 306 of FIG. 3 and involves determining level of trust by leveraging social media networks such as Facebook®. In this method, the application will send an inquiry out to various social media, for example, as were identified by the user during the user registration sequence 302 shown in FIG. 3. In this mechanism, inputs from Facebook® friends (direct or non-direct) of the user, can be used for determining level of trust for the user. Other social media inputs might be determination of similar interests. Another social media input could consider Internet consumption content, such as IT news, political news, photos, etc., that reflect interests of or consumption by the user. One way to measure this trust verification is to calculate a measure of comparison with data entered by the user during registration in sequence 302 shown in FIG. 3. Another possible social media input would be to filter only selected websites, such as only news websites.

Although the trustability step 9b typically occurs at the Wi-Fi provider server or selected local network in an exemplary embodiment, in a variation, this step can also occur in registration server, thereby providing a more robust system in case the Wi-Fi provider server is unable to get the results from social media.

Program Flows

Based on the description of the exemplary embodiment shown in FIG. 3, the present invention can also be considered to have basically three major flows: 1. User Registration; 2. Network Registration; and 3. Connection Establishment (which also executes the meter process). Additional details of these three major flows are explained as follows, using the steps as labeled in FIG. 3.

User Registration

1) User Account Registration—The user accesses the Controller Application and gets registered as a valid user.

2) User downloads WifiSup App—Once registered the user downloads the mobile device portion of WifiSup app into his/her mobile device.

3) User configures App parameters and policies—A set of policies can be enabled such as preferable time to update local database, number of attempts to retry a connection, network prioritization criteria, etc.

4) App registers mobile device—The application connects to the Controller Application and registers the mobile device and updates the user register. At this time a Digital Certificate is installed at User's mobile device.

5) App downloads WIFi database—After finishing the registration process, the WifiSup downloads the portion of the WI-FI database into its local database for an intended specific location.

Network Registration

1) User network Registration—Any network provider can access Controller Application and register its network to be available for use.

2) Provide Network information—Network information is provided. The information must contain network id, mac address, location (GPS coordinates).

3) Register Wi-Fi network—The Controller Application registers the new WI-Fi network into the database associated to a user.

4) Setup Accountability—Accounting information is already setting up for measurements and possibly billing and chargeback.

5) Update available network connections—This new Wi-Fi network is updated into the system's database and becomes available for usage by registered mobile device users.

6) Notifies WifiSup App Users—Registered users are notified about a new/updated network added into the system, as appropriate.

Connection Establishment

The flow below describes an exemplary embodiment of the method to allow a user to connect to a Wi-Fi network. Any registered user can connect to any registered network. The connection establishment method ensures that only registered users and registered networks can reach each other. The metering process responsible for accountability is used to measure and entitle users to access and connect to Wi-Fi networks. The connection process does not take in consideration if a user has credits to use to connect to a Wi-Fi network since the user can add credits in future when others users access his/her Wi-Fi connection.

1) User accesses a mobile app—WifiSup is called to be executed on the user's mobile device.

2) WifiSup identifies User needs a connection—WifiSup identifies user needs a workable connection.

3) WifiSup searches available connections within local range—WifiSup identifies all available WiFi networks around the mobile device.

4) WifiSup identifies registered Wi-Fi connections available—WiFiSup selects from the previous available networks all that are currently registered in the system.

5) WifiSup identifies best Wi-Fi connections available—WiFiSup identifies and prioritizes the best connections available (based on a user-defined connection criteria).

6) Is the connection open?—In case the best connection is an open connection, the app connects to it and leaves the initial contact portion of the application.

End Process

7) Wi-Fi provider receives request from an user—Wi-Fi router verifies if the user/request is from a valid user and ensure the authenticity of the user (one of the options is to use a digital certificate, once user connects, it validates the digital certificate, otherwise it drops the connection).

8) Wi-Fi provider validates user—Checks against system database if the user is registered and its authenticity.

9a) Is a valid user?—If the user is valid then

9b) Is a trusted user?—If the user is trusted

10) Register accountability—Create a register to enable accountability of network usage.

11) Enable connection—WifiSup communicates to user/application that connection was established and ready to use.

12) Is a connection established?

13) User drops or connection is lost—WiFi connection drops or is terminated by user.

14) WifiSup updates Wi-Fi usage for Accountability—When User finishes usage of connection or connection drops, WiFiSup updates system with usage information.

15) Exhausted registered networks?—In case failure and all networks within range are exhausted, e.g., there are no more networks around that are registered in the system, then request an update in the database so it can get a more update list of networks and credentials.

16) Select another Wi-Fi network—Select another network based on connection criteria previously defined by user. Go back to 7).

17) WifiSup requests update of local DB—WifiSup attempts to connect using a premium provider (these are network providers in agreement with the system that will enable a quick connection to load the latest network database).

18) Is there any premium provider available?—Identify if there is a premium provider around the mobile device location.

19) WifiSup connects with it—In case there is one premium provider it connects with it using local credentials.

20) WifiSup downloads database—WifiSup loads an updated local copy of network database related to location of mobile device (e.g., it leverages off GPS technology).

21) WifiSup communicates failure to connect—In case there is no premium provider (step14) and so no way to get a valid connect WifiSup exits, reporting there is no connectivity available.

End Process

End Process

From the above descriptions and contents of FIGS. 1-3, it should be clear that the present invention provides a trusted method for consuming and sharing Wi-Fi Internet access. It enables a credential—less method to allow any user to dynamically access any Wi-Fi network without requiring the user to provide credentials for connection, based on the autonomously-trusted definition of the application program described above. It further provides a mechanism so that users can expedite mobile access and permits connection without requiring that the user register at the time of connection. The method also will increase mobile application usage by allowing these applications to always be available by having Internet connectivity always available and provides transparent access through mobile applications.

The present invention will also reduce Wi-Fi costs since it can increase Wi-Fi network utilization up to its potential of 100% utilization. The method also allows a user to leverage the user's own personal Wi-Fi network and get credits for its usage so that the user can use these credits to access others' Wi-Fi networks or even pay or help pay for the user's Internet bills.

Other benefits of the present invention accrue to a company that provides Internet access by reason that the increase in number of users as available by the present invention would increase advertising for that company. Additionally, the present invention would provide the capability to offer additional paid services and would leverage non-used infrastructure.

Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other types of computing environment now known or later developed.

Figure 4:
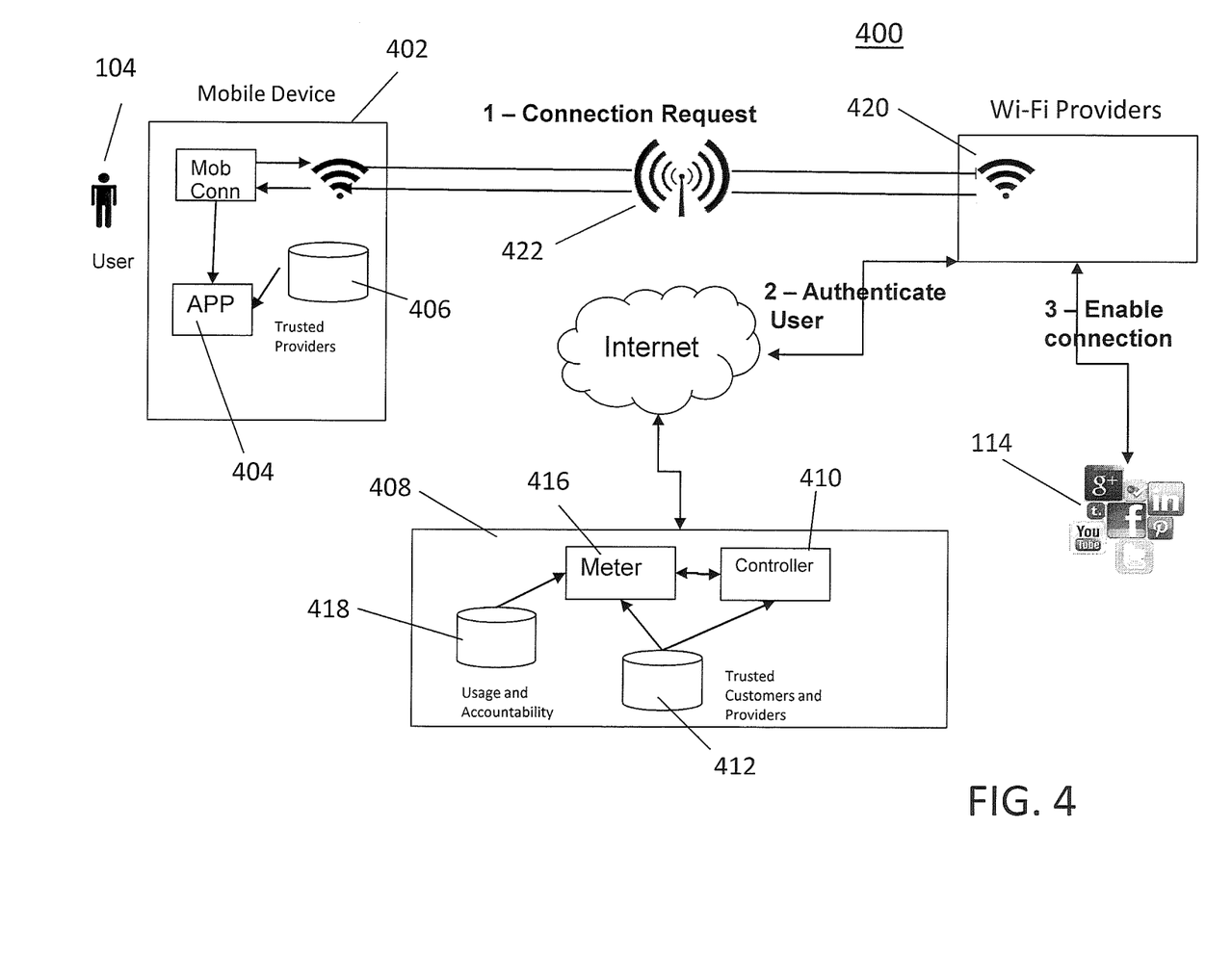
FIG. 4 shows interconnections for implementing the present invention in a network.

FIG. 4 shows exemplarily a system 400 of computers that could be used to implement the method of the present invention. User device 402 would be a portable computer-based mobile device, such as a smart phone, upon which a user would have downloaded the application program (e.g., WifiSup) of the present invention. The WifiSup app 404 is deployed in the mobile device 402 and, in a preferred exemplary embodiment, has an encrypted copy of local Wi-Fi network database 406, a list of available Wi-Fi networks around the location where the mobile user is currently located.

Server 408 is remotely accessible to a user via the Internet for purpose of contacting the system to download the application program onto his or her mobile device 402. Server 408 implements a controller 410 that is responsible for user/mobile device and Wi-Fi network registration. As well understood in the art, controller 410 could be a software program module executed by one or more CPUs on server 408, using machine-readable instructions stored in a memory device on the server 408. Controller 410 has access to a database 412 with customer/mobile device information and Wi-Fi network provider information, including information each registered user has provided during initial registration into the system for which social media 414 should be contacted for purpose of verifying trustability. The meter module 416 being executed by server 408 is responsible to collect and charge for network utilizations 418 to the associated users. This component can also interface with payment systems to allow reduced Internet bills by leveraging the credits collected through sharing of personal Wi-Fi networks.

Server 408 also stores or, at least has access to, the registry of all registered Wi-Fi networks and providers, as well as maintaining a database of users who have registered as users. Server 408 could also maintain the interface with the various Internet providers for such purposes as payments and maintaining credits/debits if a user is making available his or her personal Wi-Fi system as available for use by others as a potential local Wi-Fi network. Server 408 could also provide an interface to the social media 414 and as trustability verification module that performs the social media functions of the present invention for verifying trustability, rather than having such functions performed by the registered Wi-Fi providers 420.

FIG. 4 also demonstrates a wireless access point (WAP) 422 that allow electronic devices to connect to a wireless LAN (WLAN) network, mainly using the 2.4 gigahertz (12 cm) UHF and 5 gigahertz (6 cm) SHF ISM radio bands. A WLAN is usually password protected, but may be open, which allows any device within its range to access the resources of the WLAN network.

The Wi-Fi Alliance defines Wi-Fi as any "wireless local area network" (WLAN) product based on the Institute of Electrical and Electronics Engineers' (IEEE) 802.11 standards.

Devices 402 which can use Wi-Fi technology include personal computers, video-game consoles, smart phones, digital cameras, tablet computers, digital audio players and modern printers. Wi-Fi compatible devices 402 can connect to the Internet via a WLAN network 420 and a wireless access point 422. Such an access point (or hotspot) has a range of about 20 meters (66 feet) indoors and a greater range outdoors. Hotspot coverage can be as small as a single room with walls that block radio waves, or as large as many square kilometers achieved by using multiple overlapping access points.

Although server 408 is shown in FIG. 4 as one server, it should be clear that multiple servers accessible via the Internet could be used. As mentioned, the present invention could interface between the user's mobile device and a remote server using a cloud service.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
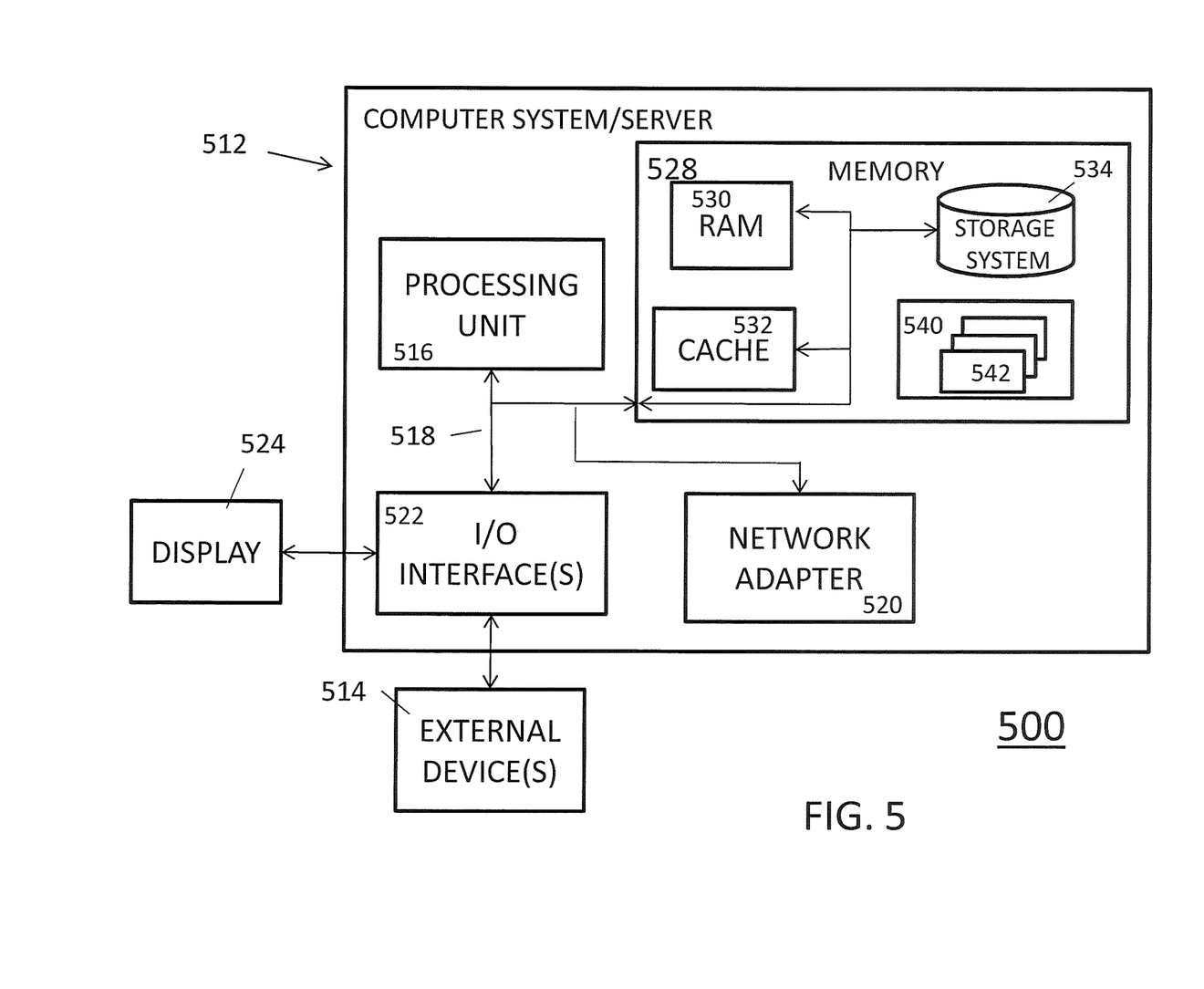
FIG. 5 depicts a cloud computing node 500 according to an exemplary embodiment of the present invention.

Referring now to FIG. 5, a schematic 500 of an example of a cloud computing node is shown. Cloud computing node 500 is only one example of a suitable cloud computing node and is not intended to suggest any limitation as to the scope of use or functionality of embodiments of the invention described herein. Regardless, cloud computing node 500 is capable of being implemented and/or performing any of the functionality set forth hereinabove.

In cloud computing node 500 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 500 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
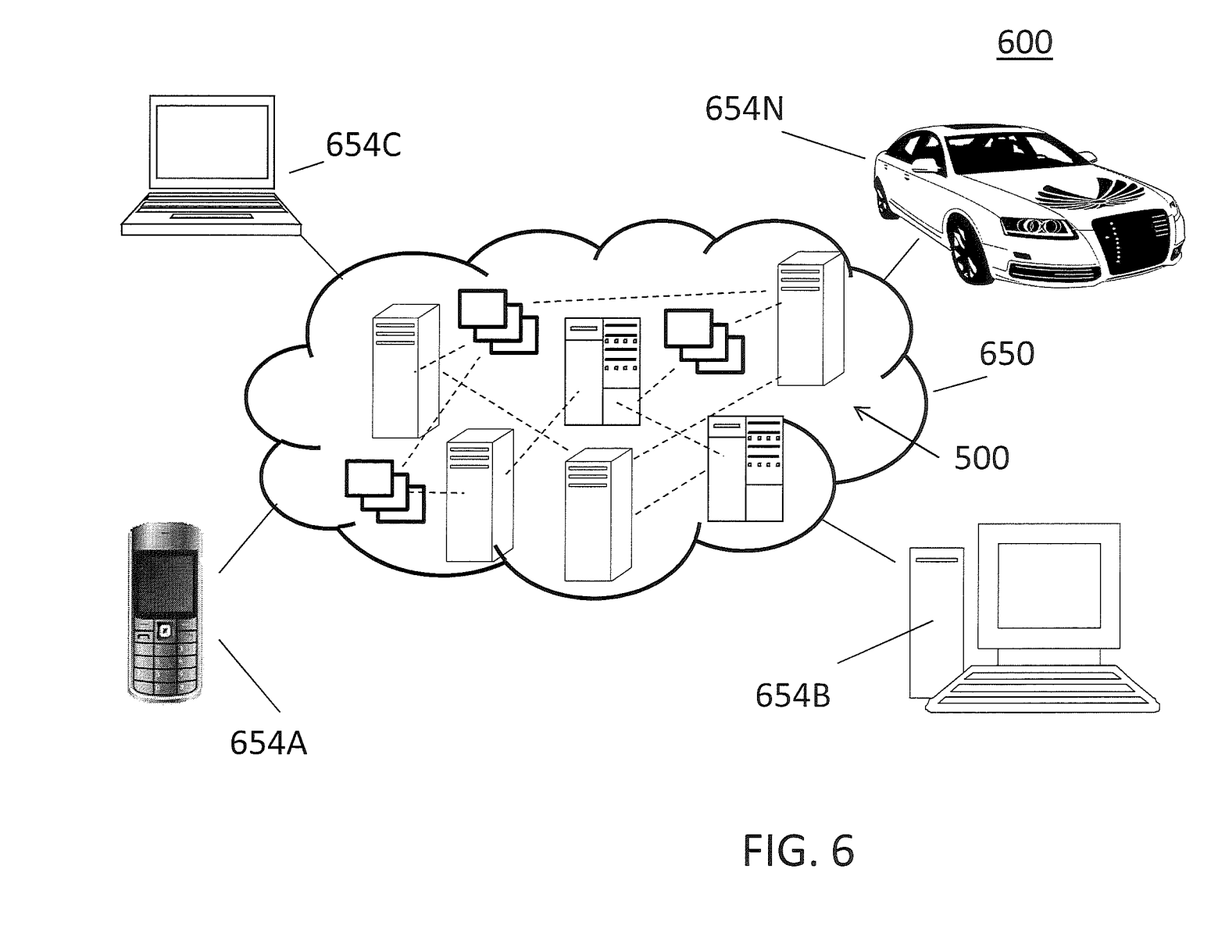
FIG. 6 depicts a cloud computing environment 650 according to an exemplary embodiment of the present invention.

Referring now to FIG. 6, an illustrative cloud computing environment 650 is depicted. As shown, cloud computing environment 650 comprises one or more cloud computing nodes 500 with which local computing devices used by cloud consumers, such as, for example, personal digital assistant (PDA) or cellular telephone 654A, desktop computer 654B, laptop computer 654C, and/or automobile computer system 654N may communicate. Nodes 500 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 500 and cloud computing environment 650 can communicate with any type of computerized device over any type of network and/or network addressable connection (e.g., using a web browser).

Figure 7:
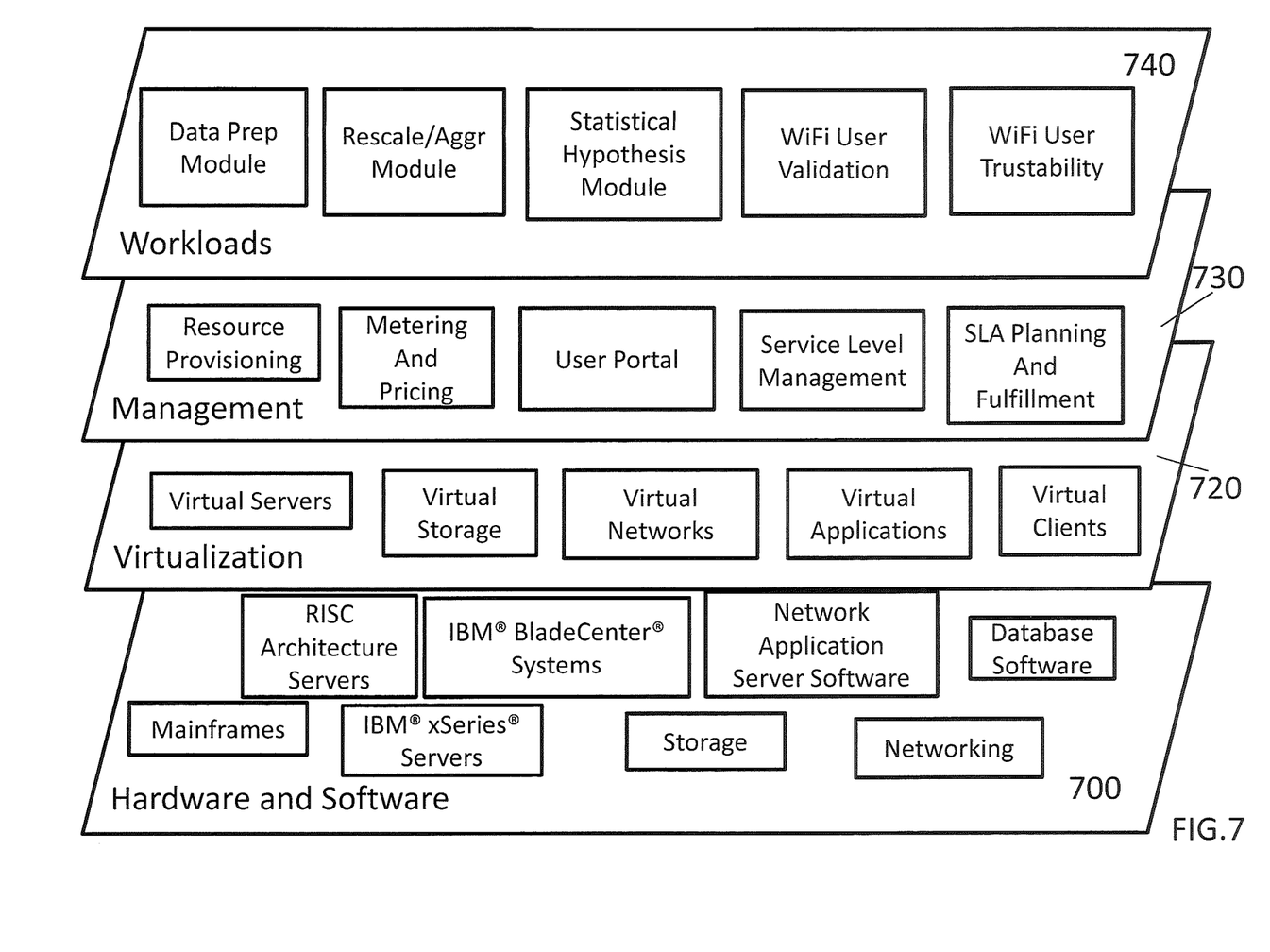
FIG. 7 depicts abstraction model layers 700-740 according to an exemplary embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The tooling that implements the present invention would be located in layer 700.

Virtualization layer 720 provides an abstraction layer from which the following examples of virtual entities may be provided: virtual servers; virtual storage; virtual networks, including virtual private networks; virtual applications and operating systems; and virtual clients. The virtual machines and network appliances that are generated and instantiated by the tooling of the present invention would operate on layer 720.

In one example, management layer 730 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 740 provides examples of functionality for which the cloud computing environment may be utilized. Examples of workloads and functions which may be provided from this layer include any number of functions and applications, such as mapping and navigation; software development and lifecycle management; virtual classroom education delivery; data analytics processing; transaction processing; and, more particularly relative to the present invention, the Wi-Fi user validation and trustability modules described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to connect a mobile device to a local Wi-Fi network, using a Wi-Fi trusted management system, said method comprising:

providing an input from the mobile device invoking an application associated with the Wi-Fi trusted management system on the mobile device, as executed by a processor on the mobile device, the application authorizing the user of the mobile device, as a user registered mobile device with the Wi-Fi trusted management system, the application authorizing the user of the mobile device to contact a server associated with the Wi-Fi trusted management system identifying and selecting any location of a plurality of locations in a database listing locations and local Wi-Fi networks at those locations that are registered with the Wi-Fi trusted management system;

receiving the input from the user of the mobile device that identifies a location selected by the user of the mobile device as a selected location;

further executing the invoked application to cause a communication with the server associated with the Wi-Fi trusted management system to request that the server provide a listing of one or more local Wi-Fi networks that are registered in the database associated with the Wi-Fi trusted management system as Wi-Fi networks at the selected location that are available for registered users of the mobile devices of the Wi-Fi trusted management system to connect the mobile device, via the application, to local Wi-Fi networks at the selected location;

receiving, from the server associated with the Wi-Fi trusted management system, the listing of one or more local Wi-Fi networks registered in the database associated with the Wi-Fi trusted management system for the selected location; and storing, in a memory device of the mobile device, the received listing of the one or more registered local Wi-Fi networks for the selected location, wherein the application further authorizes a selection of and connection to any one of the registered local Wi Fi networks stored in the memory device of the mobile device without input of the authentication information or authentication related information whenever a connection is made once the registered local Wi-Fi network selected from the mobile device confirms at the Wi-Fi trusted management system that the mobile devices is trustable as a validated and verified user device of the Wi-Fi trusted management system.

2. The method of claim 1, further comprising:

based on an input from a user of the mobile device, retrieving from the memory device of the mobile device, using the processor on the mobile device executing the application, the listing of registered local Wi-Fi networks available at the selected location;

receiving an input from the user of the mobile device that indicates a selected one of the one or more registered local Wi-Fi networks available at the selected location; and transmitting from the mobile device, via the application, a request to connect to the selected one of the registered local Wi-Fi networks listed on the retrieved listing of registered local Wi-Fi networks.

3. The method of claim 1, wherein each user mobile device registered in the Wi-Fi trusted management system is associated with a value for a reputation system in which a user's previous Wi-Fi usage is a factor taken into account to enable a current request, wherein the application is installed on a memory of the mobile device and includes a listing available local networks and maintains credentials for each available network to avoid authentication information at a time of making a connection request by the mobile device.

4. The method of claim 1, as achieved via a cloud service, wherein the registered local Wi-Fi network selected by the user of the mobile device, upon receipt from the mobile device of the request to connect, transmits a request to a controller to request that the controller validate that the user is a registered user of the Wi-Fi trusted management system.

5. The method of claim 2, wherein the registered local Wi-Fi network selected by the user of the mobile device, upon receipt from the mobile device of the request to connect, transmits a request to a controller, as executed by a central processing unit (CPU) of a server accessible by the selected registered local Wi-Fi network via a network, to request that the controller validate that the user is a registered user of the Wi-Fi trusted management system and, upon a receipt of a confirmation from the controller that the user is registered, the selected registered local Wi-Fi network requests the controller to transmit data for the user that identifies one or more social media associated with the user for purpose of verifying the user as trustable, based on information previously entered by the user into the Wi-Fi trusted management system.

6. The method of claim 5, wherein the verifying of the user of the mobile device as trustable is determined by checking whether the user of the mobile device is direct-connected to the Wi-Fi provider, further comprising permitting the mobile device to connect to the local Wi-Fi network in response to an indicator that the user is a valid registered user and it is determined that the user is trustable from an external database including information associated with each user registered with the Wi-Fi trusted management system, wherein as a user registered mobile device with the Wi-Fi trusted management system to request via the application to make connections to local Wi-Fi networks registered with the Wi-Fi trusted management system without entering any registration information, passwords, or authentication information during a connection request.

7. The method of claim 2, wherein the selected registered local Wi-Fi network, upon receipt from the mobile device of the request to connect, checks a digital certificate associated with the mobile device to determine whether the user is a registered user of the application.

8. The method of claim 2, wherein, instead of receiving the input from the user, the selected registered local Wi-Fi network is automatically determined by a processor in the mobile device, based on one or more connection parameters entered by the user of the mobile device upon a registration process for the application, the connection parameters being stored in a memory device of the mobile device.

9. The method of claim 8, wherein, when the selected registered local Wi-Fi network is unavailable for connection when the user of the mobile device makes a connection request, then a second registered local Wi-Fi network is selected from the listing of listed on the retrieved listing of registered local Wi-Fi networks at the selected location.

10. The method of claim 2, wherein the connecting the mobile device to the selected registered local Wi-Fi network is based on one or more filters.

11. The method of claim 10, wherein the one or more filters comprise one or more of:

an access filter that enables only predefined specific sites or protocols;

a bandwidth filter that limits a bandwidth usage of a requested connection; and a priority filter that sets a quality of service (QoS) for the requested connection.

12. The method of claim 10, wherein the filters are based upon a level of trust reported by selected registered local Wi-Fi networks.

13. The method of claim 4, further comprising connecting the mobile device to the selected registered local Wi-Fi network upon receipt of an indication by the selected registered local Wi-Fi network that the user has been validated and verified as trustable via the application, without the user having to enter any registration information, passwords, or authentication information, based on an input from a user of the mobile device, retrieving from the memory device of the mobile device, using the processor on the mobile device executing the application, the listing of registered local Wi-Fi networks available at the selected location;

receiving an input from the user of the mobile device that indicates a selected one of the one or more registered local Wi-Fi networks available at the selected location; and transmitting from the mobile device, via the application, a request to connect to the selected one of the registered local Wi-Fi networks listed on the retrieved listing of registered local Wi-Fi networks.

14. A method for connecting a local Wi-Fi network to a mobile device, said method comprising:

receiving a request from a mobile device to connect;

based upon said receiving said request to connect, transmitting a request to a remote server associated with a Wi-Fi trusted management system, accessible via a network, that the remote server provide an indication whether the user is validated and, in response to the Wi-Fi trusted management system indicates that the user is validated, to also provide social media information related to determining a trustability of the user;

receiving from the remote server a response;

authorizing the mobile device to connect to the local Wi-Fi network according to the response that indicates that the user is a valid registered user and it is determined that the user is trustable without entering any registration information, password, or authentication information at any connection time, as determined by using a process involving one or more social media, the social media being identified by the remote server after retrieving from a database associated with the remote server social media information associated with the user, the database containing social media information associated with each user registered with the Wi-Fi trusted management system; and connecting the mobile device to the local Wi-Fi network according to the authorizing.

15. The method of claim 14, wherein a level of trust determined during said process involving one or more social media invokes one or more filters comprising one or more of:

an access filter that enables only predefined specific sites or protocols;

a bandwidth filter that limits a bandwidth usage of a requested connection; and a priority filter that sets a quality of service (QoS) for the requested connection, wherein an application is installed on a memory of the mobile device and includes a first listing of available local networks at a first location and the application maintains credentials for each available network to avoid authentication information at a time of making a connection request by the mobile device at the first location, and wherein as the mobile device moves to a second location, the application downloads a second listing of available local networks to avoid authentication information at a time of making a connection request by the mobile device at the second location.

* * * * *